United States Patent [19]

Riggs et al.

[11] 4,352,299

[45] Oct. 5, 1982

[54] INTERMITTENT MOTION GEAR APPARATUS

[75] Inventors: Robert R. Riggs, South Bend; Paulmer D. Hunt, Mishawaka, both of Ind.

[73] Assignee: The Bendix Corporation, Southfield, Mich.

[21] Appl. No.: 142,205

[22] Filed: Apr. 21, 1980

Related U.S. Application Data

[62] Division of Ser. No. 952,029, Oct. 16, 1978, Pat. No. 4,249,453.

[51] Int. Cl.³ .............................................. F16H 27/04

[52] U.S. Cl. ...................................... 74/84 R; 74/435

[58] Field of Search ................... 74/820, 827, 436, 84, 74/435

[56] References Cited

U.S. PATENT DOCUMENTS

| | | | |
|---|---|---|---|
| 2,566,945 | 9/1951 | Laze | 74/435 |
| 2,976,471 | 3/1961 | Harris | 74/435 |
| 3,590,661 | 7/1971 | Chaveneaud | 74/820 |
| 3,703,027 | 11/1972 | Geyler | 74/820 |

*Primary Examiner*—Kenneth Dorner

*Attorney, Agent, or Firm*—Leo H. McCormick, Jr.; Ken C. Decker

[57] ABSTRACT

An intermittent motion gear apparatus for positioning a control valve to an open position in response to a predetermined input. An input greater than the predetermined input has no effect on the valve's position but sets a mechanical servo for a desired output corresponding to an operational position of a motor. When the operational position of the motor is reached, a feedback signal acts on the intermittent motion to move the control valve to a null or closed position.

3 Claims, 5 Drawing Figures

INTERMITTENT MOTION GEAR APPARATUS

This is a division of application Ser. No. 952,029, filed Oct. 16, 1978 now U.S. Pat. No. 4,249,453.

BACKGROUND OF THE INVENTION

Pneumatic actuators such as disclosed in U.S. Pat. No. 3,209,537 which provides a rotational output in response to a limited input signal are well known in the art of control mechanisms. The actuator of the present invention is of the continuous rotational category and is to be distinguished from those actuators such as disclosed in U.S. Pat. No. 3,486,518 which provides a rotational output in discrete steps and the continuous rotational actuator which uses a hydraulic servo mechanism to direct the position of the pneumatic supply control valve.

The prior art pneumatic motor actuators are not entirely satisfactory for use in certain operational environments wherein size, weight, reliability and resistance to heat or vibration are of prime concern.

SUMMARY OF THE INVENTION

The present invention relates to a fluidic control system for a motor which produces a continuous, directional, and specific angular output from a given input signal. The fluidic control system which accepts either angular or linear input motion, utilizes a direct drive mechanical servo to control a rotary plate directional control valve in order to direct a supply of fluid to a motor to thereby provide a desired rotational output.

The direct mechanical servo is a combination of a compound epicyclic gear train which receives a feedback position signal from the motor and an intermittent motion gear mechanism which directly engages the control valve. The compound epicyclic gear train allows the input motion and feedback position signal to act independently and/or simultaneously of one another to corresponding position the control valve signal to allow the required fluid to be communicated to the motor. Motion gear mechanism directs the position of the control valve and restrains the control valve in its last directed position against the effects of external forces.

The intermittent motion gear mechanism generally relates to the family of limited engagement mechanisms known as "geneva lock" mechanisms such as disclosed in U.S. Pat. Nos. 2,566,945 and 4,012,964, however, these prior art devices were not suitable for the operational environment of applicants' actuator.

Applicants' intermittent motion gear mechanism is an improvement over such "geneva lock" mechanisms and directs the position of the control valve only between predetermined angular positions whereby the control valve opens and reaches a fully open position only for a predetermined input. An input greater than this predetermined amount has no further affect on the valve's position but sets the mechanical servo for the desired output. The feedback position signal from the motor acts through the compound epicyclic gear train and the intermittent motion gear mechanism to move the control valve to a null position when the desired output is reached.

The present invention further includes a fluid regulator which receives a variable operational signal from the motor to regulate the pressure of the fluid supplied to control valve as a function of the differential between the pressure of the supply fluid and the exhaust from the motor.

It is an object of the present invention to provide a motor actuator that utilizes direct mechanical control of a fluid supply rather than the heretofore hydromechanical system of the prior art, thereby eliminating the problems associated with hydraulic power failure.

It is another object of the present invention to maintain the supply pressure as a function of the variable inlet pressure to a pneumatic motor thereby utilizing only the minimum regulated pressure necessary to overcome the output torque.

Another object of the present invention is to provide a motor with a regulator that limits the output torque of the motor.

It is a further object of the present invention to provide a pneumatic motor actuator that is light in weight, relatively insensitive to temperature changes, of low leakage, resistant to air supply contaminants, and resistant to external forces, all of which are necessary for reliable performance in the gas turbine engine environment.

Other objects and advantages of the present invention should be apparent from the following description and accompanying drawings.

DESCRIPTION OF THE INVENTION

Figure 1:
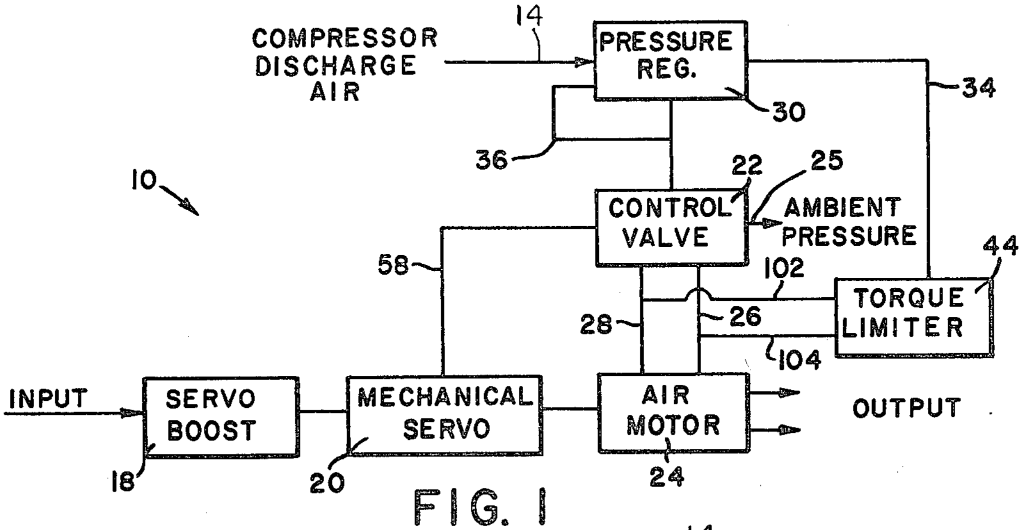
FIG. 1 is a block diagram of a control system for a motor assembly made according to the principles of this invention.

Referring to FIG. 1 numeral 10 generally designates the motor actuator which can be used in a gas turbine engine environment for positioning and controlling various aircraft engine functions such as the engine nozzle area, guide vanes, aircraft air foils or inlet area. The actuator 10 responds to an operational input, such as a request for a change in speed of the aircraft or one of the many functions performed by a turbine engine control system, to control the communication of a source of fluid under pressure to motor elements 48 and 50 of motor assembly 24. The fluid under pressure acts on the motor elements 48 and 50 to rotate the same and produce an output to meet the operational input request.

Figure 2:
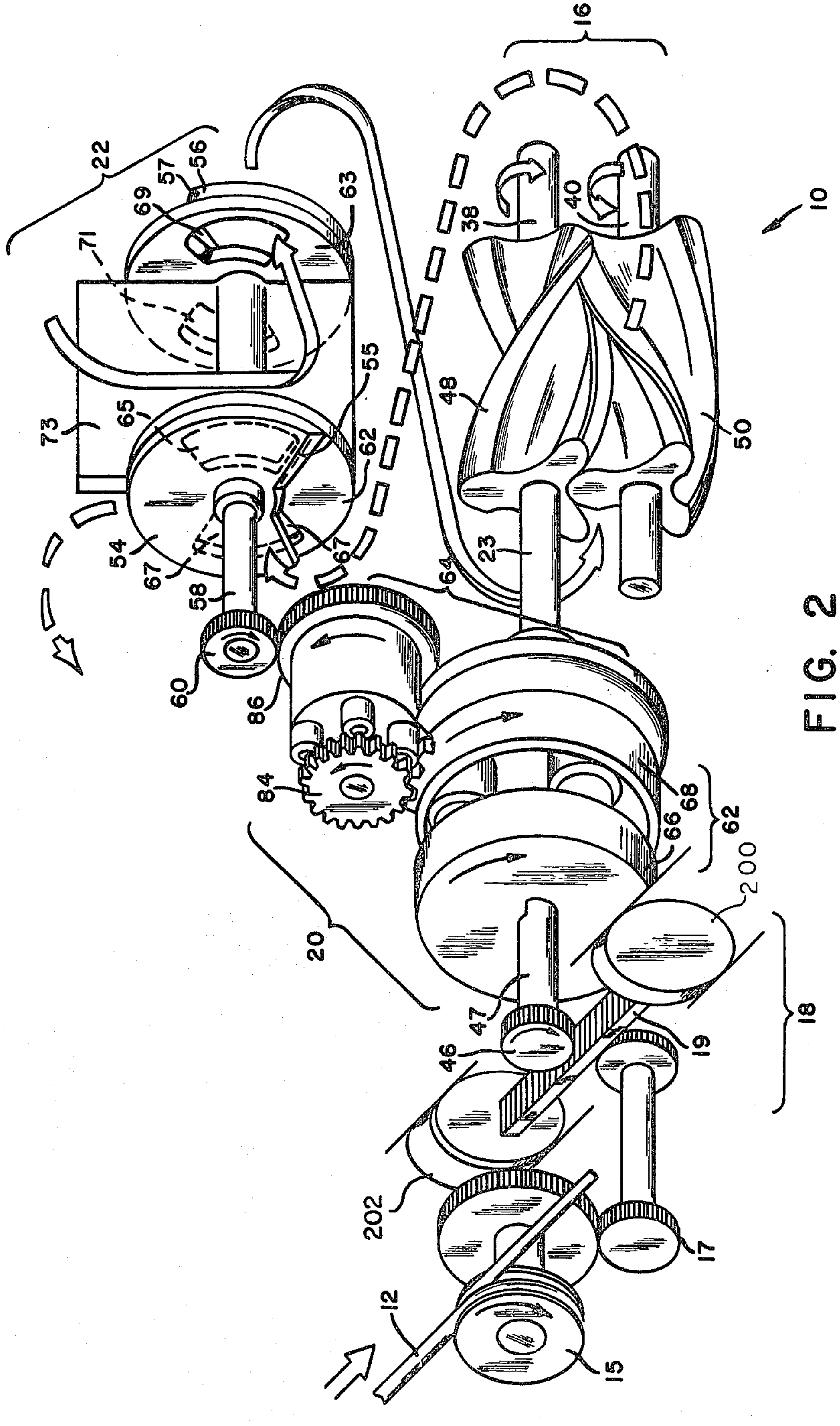
FIG. 2 is a schematic illustration of the mechanical elements of the present invention.

The operational input which can either be linear or angular motion transmitted through belt 12, may be given a power boost through a servo-power assembly 18 shown in FIG. 2 in order to deliver sufficient mechanical force to operate the remainder of the actuator. The servo-power assembly 18 is adapted to transmit angular mechanical motion to a direct mechanical servo assembly 20.

Figure 5:
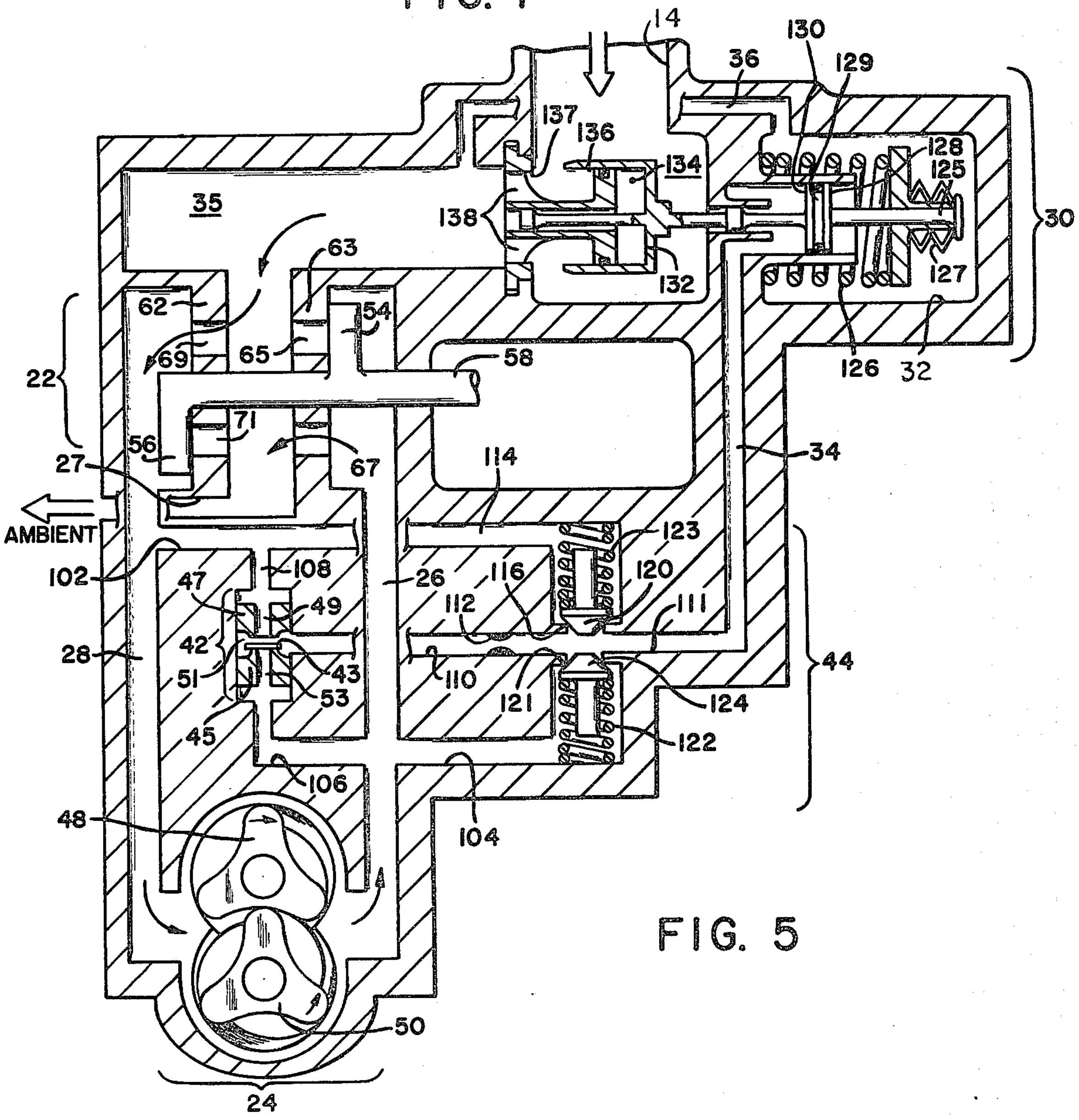
FIG. 5 is a sectional view of the motor actuator showing a flow path for an operational fluid.

The mechanical servo assembly 20 is responsive to both the mechanical motion of the servo power assembly 18 and a feedback signal which represents the work being performed by the motor elements 48 and 50. The rotary output of the mechanical servo assembly 20 positions a control valve assembly 22 through linkage or shaft 58 to control the flow of fluid in conduit 14 to and from the motor assembly 24 along flow passage or conduits 26 and 28. Depending on the operational input to the mechanical servo assembly 20, the position of the control valve assembly 22 determines which flow passage 26 or 28 is the supply conduit and which is exhaust conduct. For example, when flow passage 28 is the supply conduit, as shown in FIG. 5, flow passage 26 is the exhaust conduit through which fluid from motor elements 48 and 50 is transmitted to the surrounding environment via passage 27 and conduit 25.

The supply of fluid under pressure in conduit 14, which comes from a source, such as the compressor of a gas turbine, can vary in pressure. In order to control the pressure of the fluid supplied to motor assembly 24, a pressure regulator assembly 30 is located in conduit 14 upstream of the control valve assembly 22.

Chamber 32 of the pressure regulator assembly 22 receives a first input signal from supply conduit or chamber 35 located in conduit 14 conduit or passage 36. The first input signal represents the fluid pressure in the fluid in chamber 35 after passing through orifice 138. Chamber 32 receives a second input signal through conduit 34. The second input signal represents the fluid pressure of the regulate fluid supply after passing through control valve assembly 22 but before operating the motor elements 48 and 50. The second input signal is a reference signal which varies in a direct relation to the flow of fluid through the motor elements 48 and 50. For example, when motor elements 48 and 50 are freely rotating the pressure level of the fluid in the supply conduit is lower than when the motor elements 48 and 50 are stationary or laboring under a load. As flow passages 26 and 28 are alternately connected to the supply and exhaust through the control valve assembly 22, conduit 34 is similarly alternately connected to the regulated fluid supply through a select high pressure valve assembly 42.

The select high pressure valve assembly 42 includes a poppet valve member 43 and valve seat members 45 and 47. Valve seats 45 and 47 have passages 53 and 49 therethrough connected to a cross bore 51 for communicating fluid from conduit 102 coming from flow passage 26 and conduit 106 coming from passage 26 to passage 110. The poppet valve member 43 which is located in the cross bore 51 reacts to a predetermined pressure difference between the pressure of the fluid supplied to the motor elements 48 and 50 and the pressure of the fluid as it is exhausted to the surrounding environment through conduit 25 by moving toward whichever seat 45 or 47 is connected to the exhaust for the fluid from motor elements 48 and 50. Thus, the higher pressure of the operational fluid supplied to the motor elements 48 and 50 (the second input signal) is always communicated to conduit 34 for transmission to face 128 of piston 129.

At the same time, the fluid pressure of the supply fluid in chamber 35 is communicated to and acts on face 128 of piston 129. Under normal operating conditions with the supply fluid being communicated to the motor elements 48 and 50, the second input signal is always less than the first input signal and a regulator pressure differential is created across piston 129. When the regulator pressure differential reaches a predetermined value, the resulting force on piston 129 overcomes spring 126 and orifice member 136 attached to piston 129 is moved toward seat 137 to change the flow rate through orifice 138. As the fluid flows into chamber 35 changes or the flow through motor elements 48 and 50 changes, the regulator pressure differential changes to allow spring 126 to position the orifice member 136 a corresponding amount to match the operational input requirement with the output of the motor assembly 24.

In addition, a torque limiter assembly 44 connected to the regulator assembly 30 protects the motor assembly 24 and any system it controls from a situation wherein the output of motor elements 48 and 50 delivers a torque which could damage the system.

The torque limiter assembly 44, as shown in FIGS. 1 and 5, includes a housing with a bore 111. The housing has an inlet port connecting bore 111 to conduit 110 coming from the select high valve 42 and an outlet port connecting bore 111 to conduit 34.

Bore 111 is directly connected to conduits 26 and 28 by conduit extensions 104 and 114 of passages or conduits 106 and 102, respectively. A first pressure responsive limiter valve 124 located in extension conduit 104 monitors the fluid pressure in conduit 26 and a second limiter valve 120 located in extension conduit 114 monitors the fluid pressure in conduit 28.

Pressure limiter valve 124 is biased by spring 122 toward seat 121 and pressure limiter valve 120 is biased by spring 123 toward seat 116 to normally prevent communication from bore 111 to either extension conduit 104 or 114. However, whenever an operational condition exists which requires motor elements 48 and 50 to deliver more torque in order to operate the system, the motor elements 48 and 50 experience a decrease in rotational speed. This decrease in speed causes an increase in the inlet fluid pressure and a decrease in the exhaust fluid pressure. The increase in the inlet fluid pressure is communicated through the select high valve 42, into bore 111 of the torque limiter 44 to create a pressure differential across the pressure limiter 120 or 124 then connected to the exhaust fluid pressure. Whenever this pressure differential reaches a predetermined value, the biasing spring associated therewith is overcome and bore 111 connected to the exhaust conduit to bleed the high pressure fluid to the surrounding environment. As the fluid pressure in bore 111 decreases, a corresponding decrease occurs in the fluid in conduit 34 and the fluid pressure acting on face 130 of piston 129 allows the first pressure signal acting on face 128 to move orifice member 136 toward face 137 and thereby reduce the fluid pressure in the supply fluid. The torque limiter stays open until such time as the fluid pressure in the supply fluid is sufficiently reduced to allow the biasing spring to again seat the torque limiter and seal bore 111 from the exhaust conduit. In addition, a restrictive bleed orifice 112 located in face 111 limits the communication of pressure between conduits 110 and 34 as a function of the operational pressure between the inlet supply conduct and the exhaust conduit to control the output torque of motor elements 48 and 50.

Motor elements 48 and 50 intermesh and rotate toward each other under the influence of the fluid pressure of the supply fluid from control valve assembly 22 to provide shafts 38 and 40 with an operational output torque force representative of an input signal supplied to the servo power assembly 18.

The servo power assembly 18, as shown in FIG. 2, has a drive gear member 17 which receives a rotational torque from pully 15. Drive gear member 17 is connected to gear 46 on shaft 47 through a rack 19 attached to a dual piston assembly. Depending on the force of the input signal to pully 15, under some conditions fluid from a source may be supplied to either piston 200 or piston 202 to amplify the input motion or operational input signal sufficiently to operate the mechanical servo 20.

Figures 3, 4:
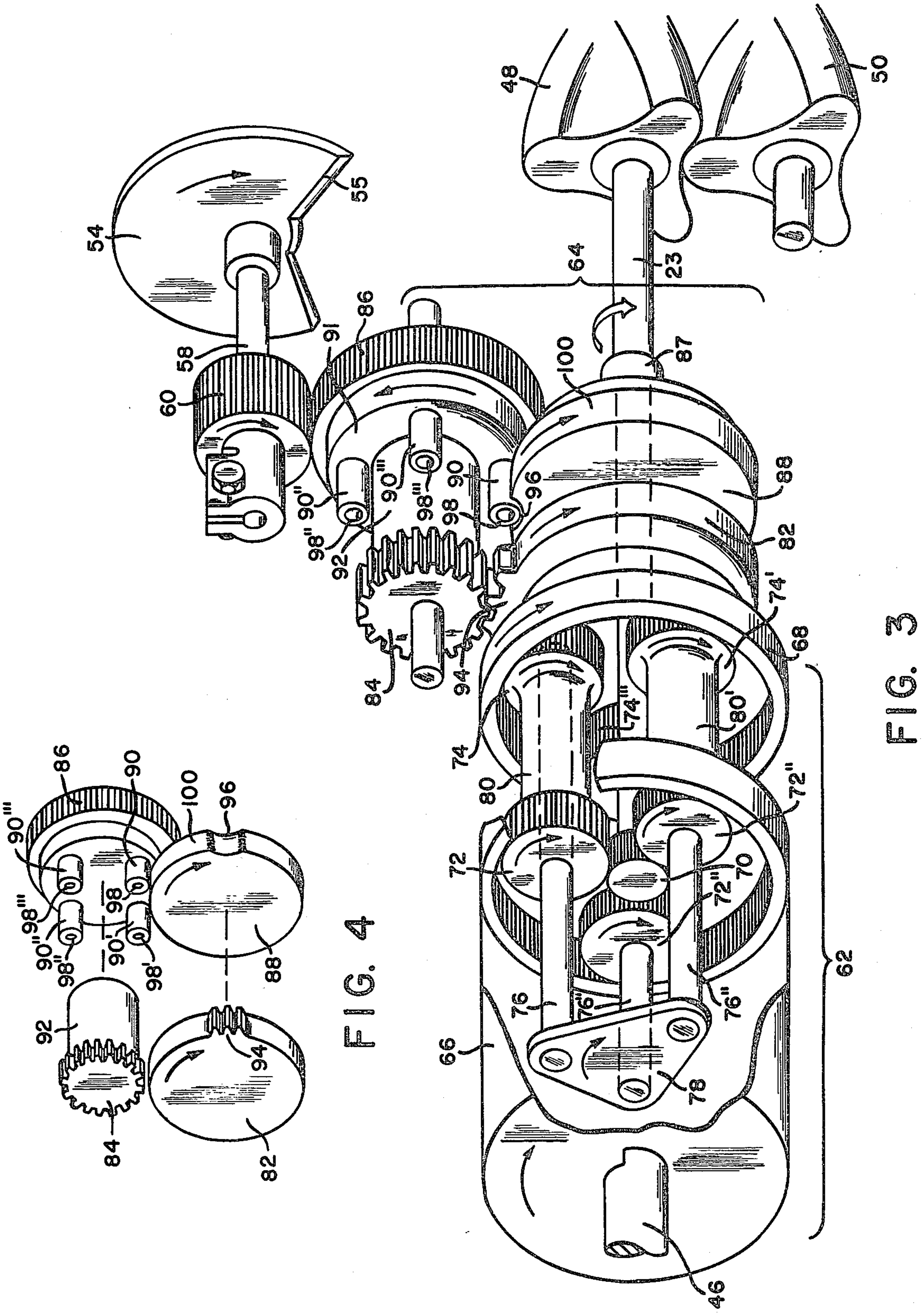
FIG. 3 is a detailed schematic illustration of a direct mechanical servo illustrating the relationship of a compound epicyclic gear train and the intermittent motion gear mechanism through which an input signal is transmitted to operate a control valve regulating an operational fluid supplied to the motor.
FIG. 4 is an exploded view illustrating the intermittent motion gear mechanism of the present invention in the disengaged position.

As shown in FIG. 3, the mechanical servo 20 includes a compound epicyclic gear train 62 and an intermittent motion gear assembly 64 through which motion is transmitted from gear 46 to shaft 58 of the control valve assembly 22.

The compound epicycle gear train 62 includes nine gears made up of the following: an input ring gear 66, an output ring gear 68, a sun gear 70, a first set of planetary gears 72, and a second set of planetary gears 74. Shaft 47 is fixed to the input ring gear 66 to provide a direct input from drive gear 46 to the first set of planetary gears 72, 72' and 72". The first set of planetary gears 72, 72' and 72" are located on corresponding shafts 76, 76' and 76". Shafts 76, 76' and 76" are fixed on a bearing plate 78 located inside of input ring gear 66. Shaft 23 which is connected to motor element 48 extends through bearing wall 87. Sun gear 70 which is attached to the end of shaft 23 engages and holds planetary gears 72, 72' and 72" in a fixed relationship with respect to input ring gear 66. The first set of planetary gears 72, 72' and 72" are connected to the second set of planetary gears 74, 74' and 74" through corresponding hubs 80, 80' and 80".

The first and second planetary gears 72, 72' and 72", and 74, 74', and 74" only differ from each other by the number of teeth thereon which engage the input ring gear 66 and the output ring gear 68. Thus, even though the first and second planetary gears are rotated together, the angular rotation of output ring gear 68 is different than the angular rotation of either the input ring gear 66 or sun gear 70. For example, assume an input from drive gear 46 rotates the input ring gear 66 in a direction indicated by the arrow in FIG. 3. As ring gear 66 rotates, planetary gears 72, 72' and 72" rotate on shafts 76, 76' and 76" and at the same time rotate about sun gear 70. Since planetary gears 74, 74' and 74" are fixed to and rotate at the same angular rate as planetary gears 72, 72' and 72", output ring gear 68 is provided with a different angular rotation. Similarly, an angular rotation input from sun gear 70 rotates planetary gears 72, 72' and 72" on shafts 76, 76' and 76" as a unitary structure with respect to the stationary input ring gear 66. However, since planetary gears 74, 74' and 74" are fixed to and rotate with gears 72, 72' and 72", the rotation of the sun gear 70 provides the output ring gear 68 with an operational rotation sufficient to operate the intermittent motion gear assembly 64.

The intermittent motion gear assembly 64 includes sector gear 82, gears 84 and 86, cam member 88, and four roller 90, 90', and 90" and 90'". As shown in FIG. 2, the sector gear 82 and cam member 88 are part of the output ring gear 68; however, it is not necessary that the entire member be formed as a single structure so long as the sector gear 82, ring gear 63 and cam member 88 rotate together.

In more particular detail, the sector gear 82 has a number of gear teeth 94 located thereon, the center tooth of which is located at the apex of a recessed portion 96 on the peripheral surface 100 of cam member 88. As shown in FIGS. 2 and 3, roller 90 is located in recess 96 at the same time teeth 94 on sector gear 82 engage gear 84. When the output ring gear 68 rotates, sector gear 82 imparts rotative motion to gear 84. Gear 84, in turn, imparts a rotative motion to gear 86 through hub 92. At the same time, roller 90 moves out of recess 96 and onto the peripheral surface 100 of cam member 88 as roller 90' engages peripheral surface 100, in a manner shown in FIG. 4. Thereafter, rollers 90 and 90' rotate on shafts 98 and 98' while peripheral surface 100 holds teeth 91 on gear 86 in engagement with gear 60. With the teeth 94 on sector gear 82 out of engagement with gear 84, the engagement of both rollers 90 and 90' with peripheral surface 100 hold gear 86 in a stationary position. Thereafter, when the output ring gear 68 rotates in the opposite direction in response to an input from sun gear 70, roller 90' enter recess 96 to synchronize the engagement of teeth 94 with the teeth on gear 84 to insure proper meshing.

Rotation of gear 60 provides shaft 58 with an operational input for rotating plates 54 and 56 with respect to apertures or air passages 65, 67, 69 and 71 in walls 62 and 63 of the housing for the control valve assembly 22. As best shown in FIGS. 2 and 5, a divider 73 separates passage 65 from passage 67 in wall 62 and passage 69 from passage 71 in wall 63 to establish a first flow path between passage 69, conduit 28, motor assembly 29, conduit 26 and passage 67 and a second flow path between passage 65, conduit 26, motor assembly 24, conduit 28 and passage 71. The plates 54 and 56, which have slots 55 and 57 located thereon, are fixed to shaft 58 such that slots 55 and 57 are located over the walls 62 and 63 when roller 90 is aligned with the center tooth on sector gear 82. The size of opening created between the edge of slots 55 and 57 on the plates 54 and 56 and the passages 65, 67, 69 and 71 as shaft 58 is rotated in response to an input signal supplied to pully 15 controls the direction and the quantity of fluid supplied to motor assembly 24 for developing a resulting output force.

MODE OF OPERATION OF THE INVENTION

Pully 15 rotates in response to an operational input signal transmitted through a belt or linkage member 12. When the input signal to pully 15 causes a clockwise rotation thereof, the fluid flow and gear rotation resulting therefrom to operate the actuator 10 is indicated by arrows in FIGS. 2, 3 and 4. When pully 15 rotates in a counterclockwise direction, the operation of the actuator 10 is the same; however, the rotations of the gears and flow of fluid are reversed. Therefore, in this detailed description, actuator 10 is only described when pully 15 rotates in a clockwise direction.

As shown in FIG. 2, the operational input signal causes pully 15 to rotate and supply gear 17 of the power servo assembly 18 with a rotational input. The rotation of gear 17 is transmitted through rack 19 which supplies gear 46 with rotary motion to move ring gear 66 through a predetermined angular displacement. At this point in time, motor element 48 is stationary and sun gear 70 attached thereto by shaft 23 remains in a fixed position. Input ring gear 66 imparts rotary motion to planetary gears 72, 72' and 72" which rotate on corresponding shafts 76, 76' and 76" around sun gear 70. The angular rotation of gears 72, 72' and 72" is carried through hubs 80, 80' and 80" to rotate planetary gears 74, 74' and 74" which in turn rotates the output ring gear 68.

Since output ring gear 68 is fixed to sector gear 82 and cam member 88, any rotation of the output ring gear 68 is transmitted to driver gear 84 and roller member 90. Rotation of gear 86 rotates gear 60 which supplies shaft 58 with an operational motion to move plates 54 and 56 and open passages 69 and 67, to chamber 35 as shown in FIGS. 2 and 5. With passages 69 and 67 open, fluid flows from supply chamber 35 to motor assembly 24 by way of flow passage 28 and exhausts fluid to the surrounding environment by way of passage 26.

The pressure of the fluid in conduit 28 is communicated through passage 102 to the select high valve 42 for communication to regulator assembly 30 by way of conduit 110 and bore 111 and conduit 34. The fluid pressure of the fluid in conduit 34 acts on face 130 of piston 129 and aids spring 126 in moving the orifice valve member 136 away from seat 137 to permit the supply fluid under pressure to flow from chamber 17 into supply chamber 35 for distribution to the motor elements 48 and 50. The supply fluid acts on motor element 48 and 50 to rotate the same and provide an output force for shafts 38 and 40 in an attempt to satisfy the operational requirements indicated by the input signal.

As rotor 48 rotates, shaft 23 also rotates and transmits rotary motion to planetary gears 72, 72′ and 72″ through sun gear 70. Rotation of planetary gears 72, 72′ and 72″ by the sun gear 70, which is always opposite to the rotation direction thereof by the input ring gear 66 is carried through hubs 80, 80′ and 80″ to planetary gears 74, 74′ and 74″ to provide the output ring gear 68 with counterclockwise rotative motion. If the input signal as represented by rotation of the output ring 68 rotates ring gear 68 to a position shown in FIG. 4, counter rotation of the output ring gear 68 by the sun gear 70 initially rotates ring gear 68 to bring recess 96 into engagement with roller 90 and insure synchronized meshing of teeth 94 on sector gear 82 and with the teeth on gear 84. With the teeth engaged, shaft 58 is thereafter given a rotative movement through the movement of gear 60 by gear 91. Rotation of shaft 58 causes plates 54 and 56 to rotate to a position which restricts the flow of the supply fluid through passage 67 into conduit 28 and the exhaust fluid through conduit 26. When the motor elements 48 and 50 have supplied the desired output corresponding to the input signal, the rotation of shaft 58 positions plates 54 and 56 to block the flow of the supply fluid through passage 67.

When the flow of supply fluid to passage 28 terminates, poppet valve member 43 moves away from seat 45 to communicate conduit 110 to passage 26 and the lower pressure therein. Thereafter, the fluid pressure acting on face 130 is reduced sufficiently to allow the pressure in the supply fluid in chamber 35 to overcome the force of spring 126 and position orifice valve member 136 on seat 137. Thus, the supply fluid is conserved. The orifice valve member 136 remains seated until such time as the control valve assembly 22 receives an operational signal indicating the need for moving shafts 38 and 40. During this inactive time period should the temperature change, temperature compensator member 127 can expand or contract to change the tension of spring 126 on shaft 125 and the force required by the fluid in chamber 35 to maintain the orifice valve member 136 in a seated position.

I claim:

1. An intermittent motion gear apparatus comprising:
- a shaft fixed to a housing;
- a first gear located on said shaft and having a first plurality of gear teeth;
- a second gear located on said shaft;
- a hub for connecting said first gear to said second gear;
- a plurality of post members fixed to said second gear;
- an input gear rotatable about an axis from a first position through a second position to a third position in response to an operational input signal;
- a sector gear secured to said input gear, said sector gear having a second plurality of gear teeth thereon for engaging said first plurality of teeth on said first gear during the rotation of said input gear from said first position to said second position to provide said second gear with angular motion; and
- a cam member secured to said input gear and having an annular circumferential surface with a recessed contour thereon, said recessed contour engaging at least one of said plurality of post members at said second position of rotation of said input gear for aligning said sector gear with said first gear to synchronize the meshing of said first and second plurality of gear teeth, said annular circumferential surface engaging at least two of said plurality of post members during the rotation of said input gear from said second position to said third position to maintain said second gear in a substantially fixed angular position.

2. The intermittent motion gear apparatus as recited in claim 1 wherein the center of said recessed portion of said circumferential surface is aligned with the center tooth of said sector gear and thereby align one of said plurality of post members with said center tooth when said input gear is in said first position.

3. The intermittent motion gear apparatus as recited in claim 2 further including:
- a plurality of rollers, one of which is located on each of said plurality of post members.

* * * * *